RANDOM ACCESS DATA FILE

Filed Jan. 13, 1967 2 Sheets-Sheet 1

INVENTOR.
JOE W. WOODS

BY E. Ronald Coffman
ATTORNEY.

May 26, 1970 J. W. WOODS 3,514,769

RANDOM ACCESS DATA FILE

Filed Jan. 13, 1967 2 Sheets-Sheet 2

United States Patent Office 3,514,769

Patented May 26, 1970

3,514,769

RANDOM ACCESS DATA FILE

Joe W. Woods, Lexington, Ky., assignor to International Business Machines Corporation, Armonk, N.Y., a corporation of New York Filed Jan. 13, 1967, Ser. No. 609,233
Int. Cl. G11b *1/02, 23/02*
U.S. Cl. 340—174.1 5 Claims

ABSTRACT OF THE DISCLOSURE

This file employs magnetically recordable sheets assembled into cells that are removably supported on a common carriage. The sheets are individually accessible by combined rotation and axial translation of the carriage. Mechanical separation is maintained between the accessing movements and data flow related input/output movements. Ancillary features of construction are provided that contribute to the overall utility of the file.

This file provides a random access memory particularly suitable for use with moderate cost, operator oriented accounting systems. Such systems require a fast data access time over a moderate data capacity in order to be compatible with the basic accounting task. For cost and operator working speed considerations, however, such systems employ input/output equipment having a relatively slow data rate. A preferred embodiment of this file has a storage capacity of four million bits, a maximum access time of less than one second and a low data rate of only 31,250 bits per second.

In the past, it has been difficult to match a requirement of fast, large capacity, access time with the low data rate and moderate cost. For example, files employing tape reels generally employ the same capstan tape drive for accessing a desired record on the tape as employed to feed the tape during reading and writing. The fixed rotational speed of a disc file or a drum file defines an accessing coordinate that also determines input/output speed.

The principal phase of my invention relates to the provision of mechanism that is mechanically independent of the means for reading from and writing into the memory for accessing any given portion of the total memory. My memory employs a plurality of magnetically recordable sheets or chips arranged in plural groups, each group being contained within an individual cell. The chips are recorded in parallel tracks on both principal surfaces thereof to provide a series of individually selectable recording tracks. The chip cells are mounted on a common supporting core that permits simultaneous axial and rotational displacement thereof to facilitate positioning of any single chip at a given fixed removal location. Simultaneous biaxial movement of the chip cell permits the flexibility of an added independent coordinate without imposing a totally independent time delay.

A chip picking device located at the removal location lifts the selected chip by a variable amount to present one of the plurality of recording tracks thereon to an independently reciprocated magnetic head or transducer. The read/write speed by which the transducer traverses the track is totally independent of accessing speed as provided by the axial and rotational displacement means. As all access motion is provided independent of the transducer, the transducer can be designed to be rugged and have a constant performance beyond that obtainable where a more mobile read/write transducer is employed.

The combination of axial and rotational displacement of the chip cell simplifies and expedites the accessing operation both by the overlap effect of the simultaneous motions and by one directional travel permitted by the rotational movement. Movement of the chip cell in the axial direction is preferably accomplished through the use of a commercially available stepper motor, and can be conveniently controlled to produce a fast access time by a slewing method explained generally in U.S. patent application, Ser. No. 379,794 now Pat. No. 3,328,658 of L. J. Thompson, entitled "Systems for Controlling Stepper Motor Operations" filed July 2, 1964. The rotational movement can be accomplished through the use of another stepper motor or a multi-stop clutch.

In addition to the basic file configuration, I have provided several ancillary features which contribute to its practical utility. The rotational mode of chip selection requires some means to retain chips again centrifugal force, and in the case of a horizontal rotational axis, against gravity. I have provided a simple spring loaded rail that extends across the tops of the chip cell and is automatically released from interfering lock cooperation with the chips when a cell is positioned at a read/write location. The rotational inertia of the file is minimized by concentration of the cell mounting structure near the center of rotation. Cells are made individually removable to further increase the total capacity of the system by permitting substitution of new file cells, if desired.

These and other objects, features and advantages, of my random access data file, will be more apparent to those skilled in the art from the following description of a preferred embodiment of my invention, wherein reference is made to the accompanying drawings, of which:

Figure 1:
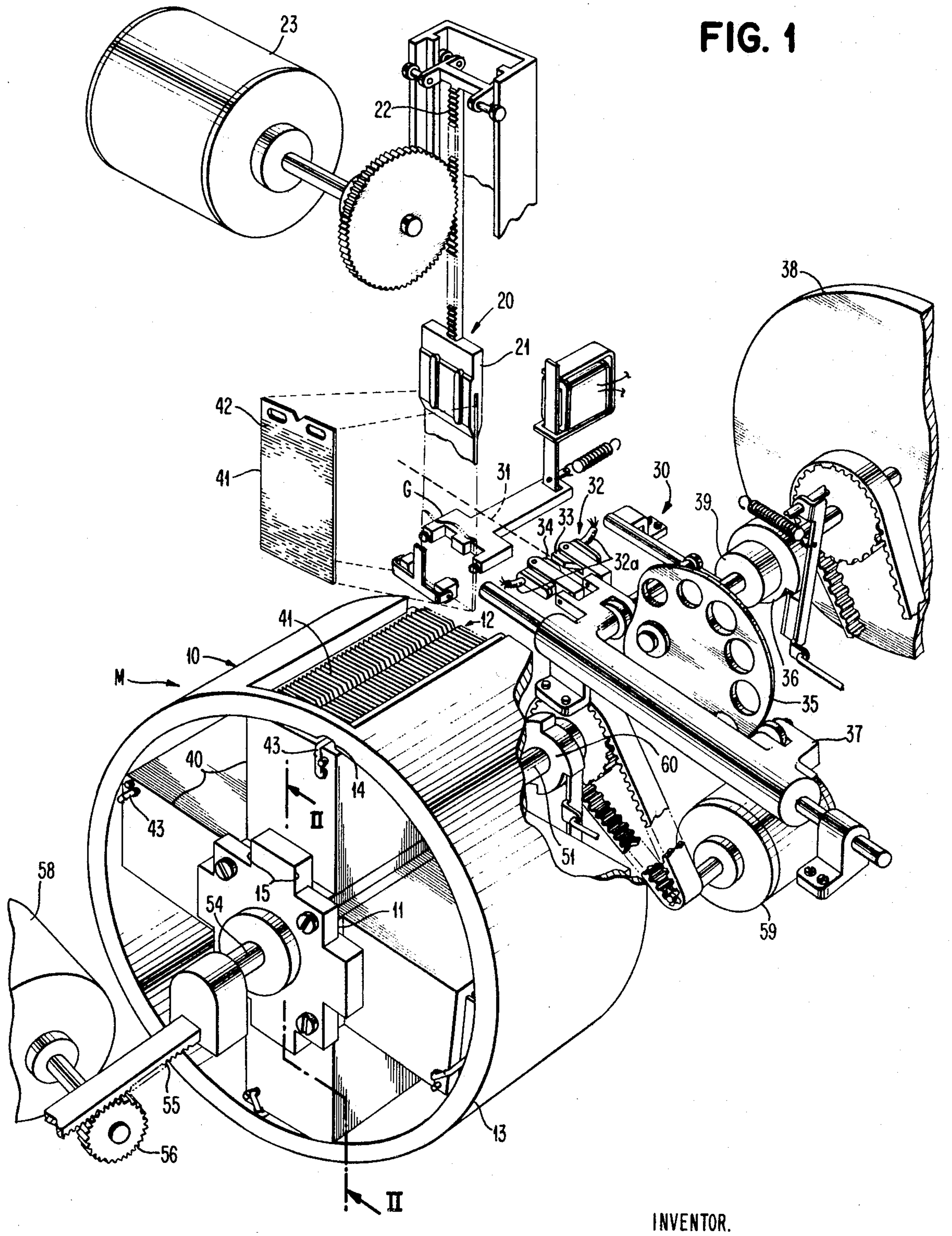
FIG. 1 is a somewhat simplified perspective view of a random access data file constructed in accordance with my invention.

More specifically, in FIG. 1 there is shown a random access data file or memory M including a file assembly 10, a chip picking or record removal mechanism 20, a chip gripping or bracing mechanism G, and a read/write transducer mechanism 30.

Figure 2:
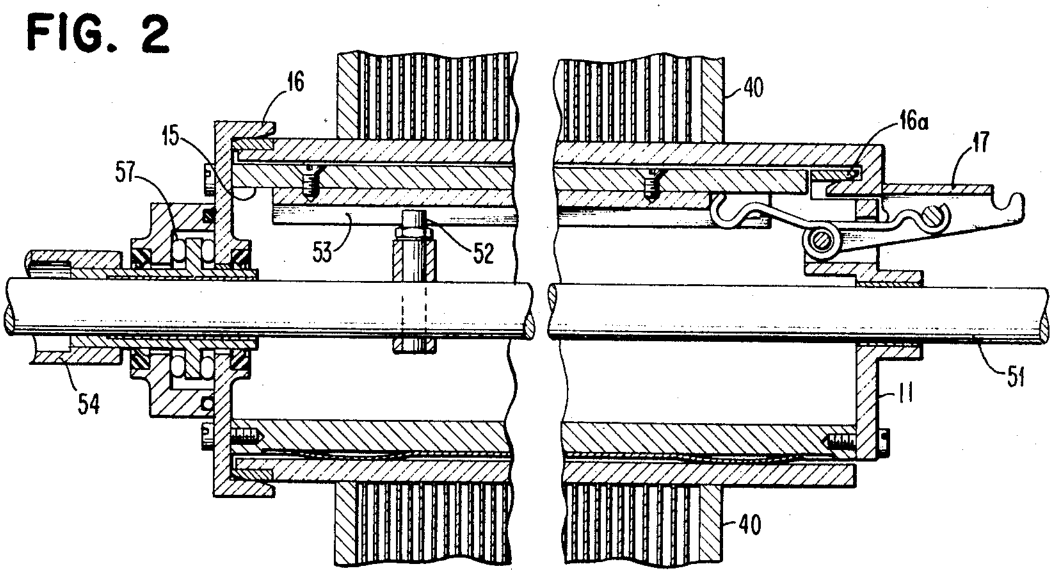
FIG. 2 is partial cross-sectional view in elevation of the file shown in FIG. 1 and is taken along lines II—II thereof.

The file assembly 10 includes four open end cells or boxes 40 each containing a parallel array of magnetically recordable sheets or chips 41. The cells 40 are removably mounted on a central mounting core or carriage 11, the details of which are best shown in FIG. 2. The mounting core 11 is securely connected to an axially fixed, rotatable shaft 51 by a radially extending pin 52 that rides in an axially extending groove, way, or track 53 internally of the core 11. The core 11 also is connected to an axially movable shaft or rod 54, a rack 55, FIG. 1, and a pinion gear 56 through a roller thrust bearing 57. Shaft 54 is connected to an axial accessing stepping motor or incrementally operating power means 58; and shaft 51 is connected to a continuous running drive motor 59 by means of a 90° incrementally operable clutch 60 providing a four step power means. It can be seen that the core 11 can be simultaneously positioned both rotationally and axially by totally independent amounts, and thereby can quickly present any chip 41 to a fixed removal location or station 12.

The picker mechanism 20 is positioned at the removal location 12 for lifting the chip 41 thus selected by clutch 60 and motor 58 into a final read/write position. The picker mechanism itself forms no portion of this invention and hence not shown in detail. An appropriate construction is described in U.S. Pat. No. 3,126,088 of J. R. Geddes entitled, "Data Storage Access Mechanism,"

issued Mar. 24, 1964. The picker mechanism 20 includes a picker head 21 that is positioned by a rack and pinion mechanism 22 under the control of a third stepping or track accessing motor 23, to present a single selected transverse recording track or zone 42 on the selected record, in line with a substantially fixed path 31 of rectilinear reciprocation of a transducer read/write head 32. The 90° clutch 60 and two stepping motors 58 and 23, operate to provide increments of motion that respectively select a cell 40, a chip 41 within the selected cell 40, and a recording track 42 on the selected chip 41.

Figure 3:
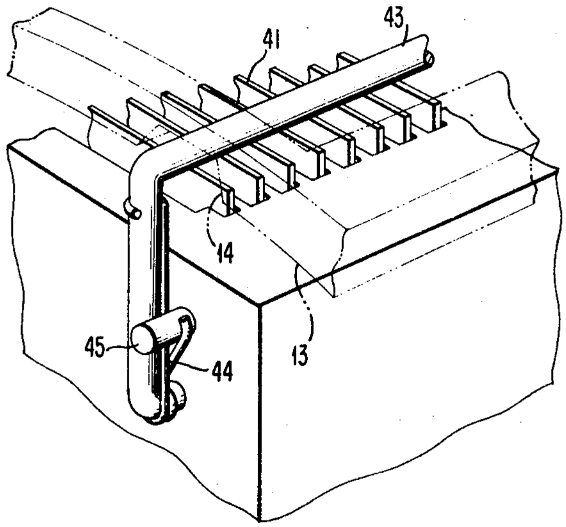
FIG. 3 is an enlarged perspective view of a construction detailed of the mechanism shown in FIGURE 1.

The chips 41 are retained within their cell 40 by transversely extending rail 43 shown more clearly in FIG. 3. The rail 43 is raised by a torsion spring 44 into contact with a rail stop or a post 45 and in such position permits the uninhibited removal of the chips 41 from the cell 40. The rail 43 is normally held in a chip retaining position by the inner surface of a surrounding ring or casing 13 and is permitted to move to its release position by a camway 14 only when cell 40 is positioned adjacent the removal station 12.

The cells 40 are removable from the cell carriage or core 11 by structure shown particularly in FIG. 2. The cells engage a positioning rail 15, see FIGS. 1 and 2, and are retained by hold down fingers or flanges 16 and **16*a* and spring loaded clip device 17**. The particular structure of the removal mounting for the cell forms no portion of this invention and can be varied to the particular need of the mechanism. It is significant, however, that the cells can be made removable in order to further increase the total capacity of a given file system by permitting cell substitution.

The read/write head 32 preferably includes a pair of electrically independent inwardly opposed transducers 33 and 34 which cooperate with the opposed principal surfaces of the chip 41 and are connected electrically through electrical wires or cables **32*a* to data processing mechanism such as a computer (not shown). Selection between one or the other surfaces of the chip 41 is accomplished simply by electrically activating one or the other transducers 33 and 34**.

The head 32 is reciprocated by a cam 35 which is selectively rotated under the control of a cyclically operating clutch 36. The cam 35 drives a reciprocating follower 37 positively in two directions to generate controlled-velocity motion of the transducer head 32.

Reproducible head velocity is essential to the satisfactory data recognition of the device. Accordingly, it is preferred to employ a flywheel 38 to minimize the effect of random energy transients, and to employ an energy trap acceleration control device 39 like that disclosed in U.S. Pat. 3,394,785 to eliminate the introduction of acceleration transients from the shock of clutch coupling.

The gripper mechanism G is shown schematically and forms no portion of this invention. The function of the gripper mechanism G is to provide support to the chip 41 immediately adjacent the read/write path 31 to promote better consistent contact between the transducers 33 and 34 and the chip surface. Magnetic reading and recording reliability is somewhat a direct function of relative transducer speed. Where high transducer speed is not available, as here due to the desired low data rate, improved performance is obtained by insuring good consistent running contact between the transducers and the magnetic surface. The particular construction of the read/write head 32 forms no part of this invention, but is more specifically described and claimed in U.S. patent application, Ser. No. 609,234 entitled, "Magnetic Head Mounting" of E. W. Parken filed simultaneously herewith.

OPERATION

A typical operation of my data file M employs a computer (not shown) that has a requirement to read or write data to or from the file. The computer identifies a particular record track within the file by an address which is translatable into four coordinate dimensions, i.e., a particular cell 40, a particular chip 41 within the cell 40, a particular recording track 42 on the chip 41, and one of the two principal surfaces of the chip 41. The operation of the file in reaching the read/write point can be overlapped with other computer operations if desired. When the computer is ready to receive or transmit information to or from the particular recording track 42 it has addressed, the clutch 36 is operated thus rotating cam 35 and causing a back and forth reciprocation of the transducer head 32. The actual transmission of data over transducer cables **32*a* occurs during the back and forth sweep and particularly during a central portion thereof wherein velocity is substantially constant. The back and forth sweep can be employed in several different modes. For example, information recorded in the forward sweep can be reread for checking purposes in the rearward sweep; or information can be recorded on one principal surface of the chip 41** during the forward sweep and additional information recorded on the opposite principal surface during the return sweep. Also a file can be updated in sequence by recording a result from a previous calculation during the forward sweep and reading data for a following calculation from the opposite surface of the chip during the return sweep.

EXAMPLE

It was mentioned above that a preferred embodiment of this file had a data capacity of four million bytes with an access time under one second, and generated a data rate of 31,250 bits per second. This performance has been obtained by providing a file with four cells 40 arranged substantially as shown, each cell containing 100 of the chips 41. The chips 41 are each about 1.4 by 2.8 inches and are coated with a conventional magnetic oxide on both sides. The data tracks 42 are recorded across the shorter dimension and are spaced about 45 mils apart in a parallel array. The length of the record is about one-inch long. Each chip has 50 data tracks on each of its principal surfaces. The file assembly 10 has a diameter of about ten inches, and is approximately three inches wide.

From the foregoing, it will be seen by those skilled in the art that I have provided a novel, high capacity, fast access, moderate cost file or memory that is particularly suited for use in combination with an operator oriented accounting system. While a specific preferred embodiment of my invention has been described herein for purposes of illustration, it will be recognized that modifications, deletions and additions can be made without departing from the spirit and scope of my invention as defined by the appended claims.

I claim:

1. A random access memory comprising a file assembly having:
- a plurality of record cells,
- mounting core means supporting said cells symmetrically about an axis for axial and rotational movement thereof,
- a plurality of magnetically recordable record sheets removably contained within each of said record cells in a mutually parallel array extending along said axis wherein said record sheets are substantially normal to said axis,
- means for simultaneously rotating and translating said core means to present a selected record sheet at a predetermined spatially fixed record removal station, and
- record removal means positioned adjacent said file assembly at said record removal station for removing and replacing a record sheet cooperatively positioned therewith by said axial and rotative movement.

2. A random access memory as defined in claim 1 wherein said cells are removably mounted on said mounting core means.

3. A random access memory as defined in claim 1 wherein each of said cells is substantially open along its radially outward side and further comprising:
   a retaining rail pivotally mounted on each of said cells and extending transversely across said record sheet array for retaining said chips within said cell, and means responsive to positioning a cell at said record removal location for displacing the associated retaining rail to a non-retaining position.

4. A random access memory as defined in claim 1 wherein said means for simultaneously rotating and translating said core comprises:
   incrementally operating power means operatively connected with said mounting core means for rotating said core means about said axis incrementally between said cells, and
   incrementally operating power means operatively connected with said mounting core means for moving said core means incrementally along said axis.

5. A random access memory as defined in claim 4 wherein
   said operative connection between said core and said first power means comprises a shaft rotatable thereby, a radially extending pin mounted on said shaft and positioned within said core, and an axially extending track within said core engaging said pin in a rotational force transfer relationship while permitting relative movement therebetween in an axial direction; and
   said operative connection between said core and said second power means comprises a pinion driven thereby, a rack engaging said pinion, and a roller thrust bearing connecting said rack with said core in an axial force transfer relation while permitting relative rotational motion therebetween.

References Cited

UNITED STATES PATENTS

| | | | |
|---|---|---|---|
| 1,925,442 | 9/1933 | Fournier | 214—16.11 |
| 2,386,520 | 10/1945 | Watson | 214—16.42 |

BERNARD KONICK, Primary Examiner

W. F. WHITE, Assistant Examiner

U.S. Cl. X.R.

209—80.5; 214—16.4; 312—186